United States Patent
Wang

(10) Patent No.: US 11,834,002 B2
(45) Date of Patent: Dec. 5, 2023

(54) ADJUSTABLE DOOR LATCH FOOTBOARD FOR AUTOMOBILES

(71) Applicant: Ningbo Tuoluzhe Auto Accessories Co., Ltd., Ningbo (CN)

(72) Inventor: Baorong Wang, Ningbo (CN)

(73) Assignee: Ningbo Tuoluzhe Auto Accessories Co., Ltd., Ningbo (CN)

( * ) Notice: Subject to any disclaimer, the term of this patent is extended or adjusted under 35 U.S.C. 154(b) by 55 days.

(21) Appl. No.: 17/577,364

(22) Filed: Jan. 17, 2022

(65) Prior Publication Data

US 2022/0242320 A1 Aug. 4, 2022

(30) Foreign Application Priority Data

Aug. 12, 2021 (CN) .......................... 202110922808.5

(51) Int. Cl.
*B60R 3/00* (2006.01)

(52) U.S. Cl.
CPC .................................. *B60R 3/007* (2013.01)

(58) Field of Classification Search
CPC .................................. B60R 3/007; B60R 3/02
See application file for complete search history.

(56) References Cited

U.S. PATENT DOCUMENTS

| | | | | |
|---|---|---|---|---|
| 4,869,520 A | * | 9/1989 | Cole | E06C 7/081 |
| | | | | 182/127 |
| 5,716,064 A | * | 2/1998 | Frerichs | B60R 3/02 |
| | | | | 280/166 |
| 5,897,125 A | * | 4/1999 | Bundy | B60R 3/02 |
| | | | | 280/169 |
| 6,149,172 A | * | 11/2000 | Pascoe | B60R 3/02 |
| | | | | 280/169 |
| 6,471,002 B1 | * | 10/2002 | Weinerman | B60R 3/02 |
| | | | | 280/166 |
| 7,390,003 B1 | * | 6/2008 | Sylvia | B60R 3/007 |
| | | | | 280/166 |
| 8,827,294 B1 | * | 9/2014 | Leitner | B60R 3/02 |
| | | | | 280/166 |
| 11,623,572 B2 | * | 4/2023 | Chen | B60R 3/007 |
| | | | | 280/166 |
| 2008/0042395 A1 | * | 2/2008 | Watson | B60R 3/02 |
| | | | | 280/166 |

(Continued)

FOREIGN PATENT DOCUMENTS

| CN | 208216612 U | * | 12/2018 | ............. B60R 3/005 |
|---|---|---|---|---|
| CN | 111422132 A | * | 7/2020 | ............... B60D 1/58 |

*Primary Examiner* — Jeffrey J Restifo
(74) *Attorney, Agent, or Firm* — Zhigang Ma

(57) ABSTRACT

This invention relates to an auxiliary tool for automobiles, specifically an adjustable car latch footboard that includes a footboard, a hook, a bracket component, and a pivot. The footboard hinges on the bracket component through the pivot, and the hook is mounted at one end of the bracket component opposite to the other end of the footboard. The hook is attached to the car latch, and the other end of the bracket component is pressed against the car door frame. One end of the footboard is pressed against the hook or the car latch. When the footboard is pressed against the hook, the car latch is positioned between the footboard and the hook. When the footboard is pressed against the car latch, the footboard and the hook grip onto the car latch.

12 Claims, 12 Drawing Sheets

(56) References Cited

U.S. PATENT DOCUMENTS

| | | | |
|---|---|---|---|
| 2008/0042396 A1* | 2/2008 | Watson | B60R 3/02 280/727 |
| 2008/0100024 A1* | 5/2008 | Leitner | B60R 3/02 280/166 |
| 2008/0100025 A1* | 5/2008 | Leitner | B60R 3/02 280/166 |
| 2009/0008896 A1* | 1/2009 | Phillips | B60R 3/007 280/166 |
| 2009/0250896 A1* | 10/2009 | Watson | B60R 3/02 280/166 |
| 2011/0062748 A1 | 3/2011 | Kaita et al. | |
| 2014/0001726 A1* | 1/2014 | Statz | B60R 3/02 280/166 |
| 2014/0333042 A1 | 11/2014 | Cha et al. | |
| 2017/0021842 A1 | 1/2017 | Aigner et al. | |
| 2018/0194290 A1* | 7/2018 | Lewis | B60R 3/007 |
| 2019/0329710 A1* | 10/2019 | Mao | B60R 3/005 |
| 2020/0361389 A1* | 11/2020 | Leitner | B60R 3/02 |
| 2021/0031696 A1* | 2/2021 | Kaddouh | B62D 33/02 |
| 2021/0347302 A1* | 11/2021 | Wang | B60D 1/58 |
| 2022/0097609 A1* | 3/2022 | Watson | B60R 3/02 |
| 2022/0242320 A1* | 8/2022 | Wang | B60R 3/007 |
| 2022/0314888 A1* | 10/2022 | Glickman | B60D 1/01 |
| 2022/0332254 A1* | 10/2022 | Smith | B60R 3/02 |
| 2023/0022042 A1* | 1/2023 | Watson | B60Q 1/0076 |
| 2023/0034860 A1* | 2/2023 | Chen | B60R 3/007 |

* cited by examiner

ADJUSTABLE DOOR LATCH FOOTBOARD FOR AUTOMOBILES

TECHNICAL FIELD

This invention relates to an auxiliary tool for automobiles, specifically, an adjustable car latch footboard.

BACKGROUND ART

When loading items into a car or cleaning a car, it is necessary to stand at an appropriate height. At present, a stool or a ladder or some common footboard in the market is used to assist the process, which is huge and inconvenient to carry. The structure of a common footboard is simple such that it can't adapt to various car door frames. When a person steps on, the car door frame may be damaged or the footboard may not be level and therefore doesn't allow the person to stand in a stable position.

SUMMARY OF THE INVENTION

In order to solve the above-mentioned problems, the present invention provides a small adjustable car latch footboard which can be horizontally adjusted, folded, and secured through the car latch. The adjustable car latch footboard occupies a small space, it is load bearing, allows a person to stand at an appropriate height, it is convenient and stable. The following technical solutions are adopted:

An adjustable car latch footboard comprises of a footboard, a hook, a bracket component and a pivot. The footboard hinges on the bracket component through the pivot, and the hook is mounted at one end of the bracket component opposite to the other end of the footboard. The hook is attached to the car latch, and the other end of the bracket component is pressed against the car door frame. One end of the footboard is pressed against the hook or the car latch. When the footboard is pressed onto the hook, the car latch is positioned between the footboard and the hook. When the footboard is pressed onto the car latch, the footboard and the hook grip onto the car latch.

By adopting the above-mentioned technical solutions, the bracket component, the footboard and the hook form a structure similar to scissors through the pivot. The hook is inserted from the top of the car latch and hangs on the car latch. The other end of the bracket component is pressed against the car door frame. The footboard is at one end of the car latch and pressed against the car latch or the hook. When the top of the footboard is pressed against the hook, the footboard and the hook grip form an interlocking structure, and the footboard and the hook are pressed against the car latch, thereby improving the stability of the connection between the adjustable car latch footboard and the car latch and prevents the adjustable car latch peddle from wobbling. The footboard is leveled or nearly leveled through the pivot and the bracket component, which is convenient for people to use. Since the car latch is usually positioned at the lower middle point of the car height, people can conveniently load and unload items onto or off the car roof when stepping on the footboard.

Preferably, a fixture block is mounted at one end of the footboard, opposite to the hook and at both sides of the hook.

By adopting the above-mentioned technical solutions, the fixture blocks at both sides of the hook form an intermeshed structure, forming a reliable locking structure that constrains the hook and the footboard on the car latch. The fixture block and the hook can also be pressed against the car latch together. In this case, the contact area between the fixture block and the car latch is increased to achieve higher stability and reliability, and effectively reduces the wobbling of the adjustable car latch footboard.

Preferably, a reinforcing block is secured to the end of the footboard, opposite to and in contact with the hook and the car latch.

By adopting the above-mentioned technical solutions, the reinforcing block is made of steel and alloy steel characterized by a high degree of hardness so that can be pressed against the car latch without deformation.

Wherein, fixture blocks are secured to the reinforcing block, opposite to the hook and at both sides of the hook.

By adopting the above-mentioned technical solutions, the fixture block forms an integral structure with the reinforcing block, both of which are made of steel and alloy steel characterized by a high degree of hardness.

Preferably, a support block is installed at the other end of the bracket component.

By adopting the above-mentioned technical solutions, the support block is made of plastic or an elastic material to avoid pressure damage to the car door frame.

Preferably, at least two adjusting surfaces are mounted on the support block.

By adopting the above-mentioned technical solutions, the adjusting surfaces can assist in adjusting the level of the footboard and increase the adjustment range.

Furthermore, the two support blocks are symmetrically installed on both sides of the bracket component.

By adopting the above-mentioned technical solutions, the support blocks are symmetrically mounted on both sides of the bracket component to increase its contact area with the door frame and provide support from both sides of the bracket component to improve the stability of the bottom part of it, so as to raise the overall stability of the adjustable car latch footboard, reduce wobbling, and avoid damage to the car door frame.

Preferably, the footboard is designed with non-slip stripes.

By adopting the above-mentioned technical solutions, the non-slip stripes can prevent slipping when a person stands on the footboard.

Preferably, the invention also comprises a ratchet, a first pawl and a first spring. The ratchet is rotatably mounted on the pivot and the hook is mounted on the ratchet; the first pawl is movably mounted on the bracket component and on one side of the pawl; the first spring is connected to the bracket component and the first pawl at both ends, and presses the first pawl against the ratchet.

By adopting the above-mentioned technical solutions, the ratchet and the pawl are used to adjust the angle of the footboard so that it can be adjusted and secured at any angle in order to adapt to various vehicle models. The footboard position can be adjusted by toggling the pawl to level the footboard.

Wherein, the first pawl is mounted with the first toggle on one side of the hook.

By adopting the above-mentioned technical solution, when folding or adjusting the footboard angle, a person can press the first toggle to separate the first pawl from the ratchet and then adjust the footboard angle or fold the footboard; it is not required to press the first toggle when the footboard is unfolded or adjusted upwards. Instead, the footboard can be directly pulled away from the bracket component, during which, the first pawl locks the ratchet by being pushed by the first spring, so that the footboard can be fixed at whatever angle is required.

Preferably, the invention also comprises a second pawl and a second spring. The second pawl is movably mounted on the footboard; the second spring is connected to the footboard and the second pawl at both ends, and presses the second pawl against the ratchet.

By adopting the above-mentioned technical solutions, the second pawl achieves the relative fixation of the footboard and the ratchet. When the footboard is adjusted upwards, the second spring pushes the second pawl to lock the ratchet and prevent the hook from rotating upwards, and thereby facilitates the adjustment of footboard level.

Furthermore, the second toggle is mounted on the second pawl and in the toggle hole of the footboard.

By adopting the above-mentioned technical solutions, the footboard can be separated from the car latch by pressing the second toggle, and thereby facilitates the removal of the adjustable car latch footboard.

Preferably, the bracket component comprises a bracket base hinged to the pivot and a sliding bar inserted into the bracket base;

The invention also comprises a ratchet, a fifth pawl and a fifth spring. The ratchet is rotatably mounted on the pivot and the hook is mounted on the ratchet; the fifth pawl is mounted on the end of the sliding bar and opposite to the pawl; the fifth spring is connected to the sliding bar and the bracket base at both ends, and presses the fifth pawl against the ratchet.

By adopting the above-mentioned technical solutions, the fifth pawl and the ratchet work to adjust the hook position in order to change the footboard position. The structure is simple and easy to use.

Compared with the prior art, the present invention has the following beneficial effects:

The adjustable car door latch footboard claimed in this invention can be conveniently mounted onto the car latch to ensure that items can be loaded or unloaded at an appropriate height. The footboard is horizontally adjustable, foldable, compact (occupying little space), stable, and convenient.

DESCRIPTION OF THE DRAWINGS

FIG. 10 3D schematic view of FIG. 9;

DETAILED DESCRIPTION OF THE PREFERRED EMBODIMENTS

Figure 1:
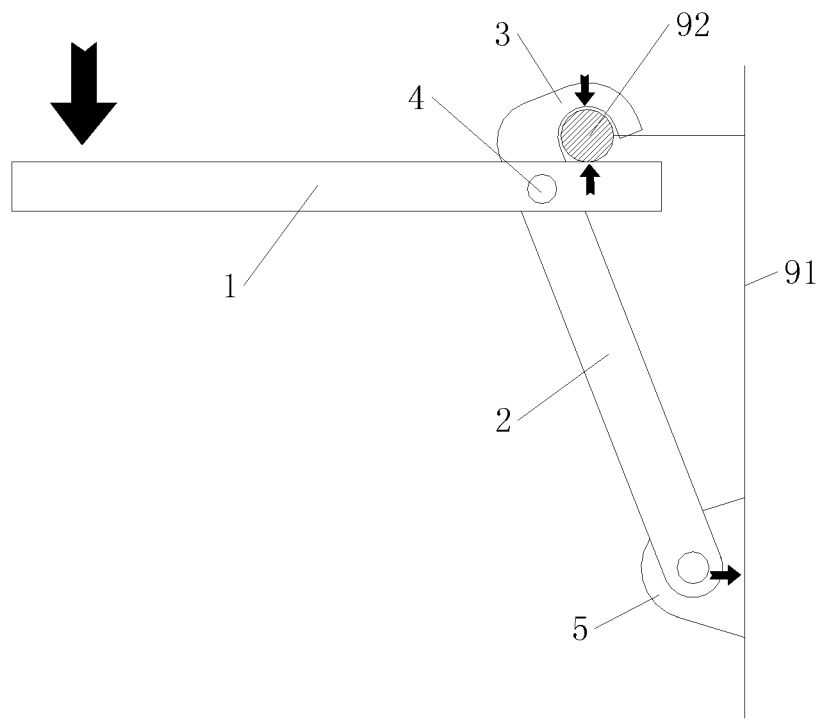
FIG. 1 Schematic view of Embodiment 1.

The present invention will be further described with reference to the accompanying drawings.

Embodiment 1

As shown in FIG. 1 to FIG. 19, the adjustable car latch footboard comprises footboard 1, hook 3, bracket component 2 and pivot 4. Footboard 1 hinges on bracket component 2 through pivot 4, and hook 3 is mounted at one end of bracket component 2 and opposite to one end of footboard 1. Hook 3 is attached to car latch 92, and the other end of bracket component 2 is pressed against car door frame 91. One end of footboard 1 is pressed against hook 3 or car latch 92. When footboard 1 is pressed against hook 3, car latch 92 is positioned between footboard 1 and hook 3. When the footboard 1 is pressed against car latch 92, footboard 1 and hook 3 grip onto car latch 92.

Specifically, one end of footboard 1 is mounted with rotary groove 12, in which pivot 14 is secured. Bracket component 2 is rotatably mounted on pivot 4, and movably inserted into rotary groove 12. Hook 3 and bracket component 2 can form an integral structure and are located in bracket component 2. Bracket component 2, footboard 1 and hook 3 form a foldable scissor structure.

Bracket component 2 and footboard 1 form a structure similar to a scissor through pivot 4. Hook 3 is inserted from the top of car latch 92 and hung on car latch 92 located in the groove of hook 3. The other end of bracket component 2 is pressed against car door frame 91. Footboard 1 is at one end of car latch 92 and pressed against car latch 92 or hook 3. When the top of footboard 1 is pressed against hook 3, footboard 1 closes the groove on hook 3 and forms a closed structure with hook 3 to constrain it on car latch 92 so that car door latch 92 is fixed in the groove of hook 3 to prevent hook 3 from falling out during use and improves safety. When the end of footboard 1 is pressed against car latch 92, footboard 1 grips hook 3 and both footboard 1 and hook 2 are pressed against car latch 92, so as to enhance the stability of the adjustable car latch footboard on car latch 92 and avoid the adjustable car latch footboard wobbling. Footboard 1 is leveled or nearly leveled through pivot 4 and bracket component 2 facilitates its use. Since the position of car latch 92 is usually positioned at the lower middle point of the car height, people can conveniently load and unload items onto or off the car roof when stepping on footboard 1.

For storage, bracket component 2 is folded to occupy a little space under footboard 1.

In some embodiments, footboard 1 is designed with non-slip stripes 11 to prevent slipping when a person stands on footboard 1 and improve safety.

Embodiment 2

Figure 2:
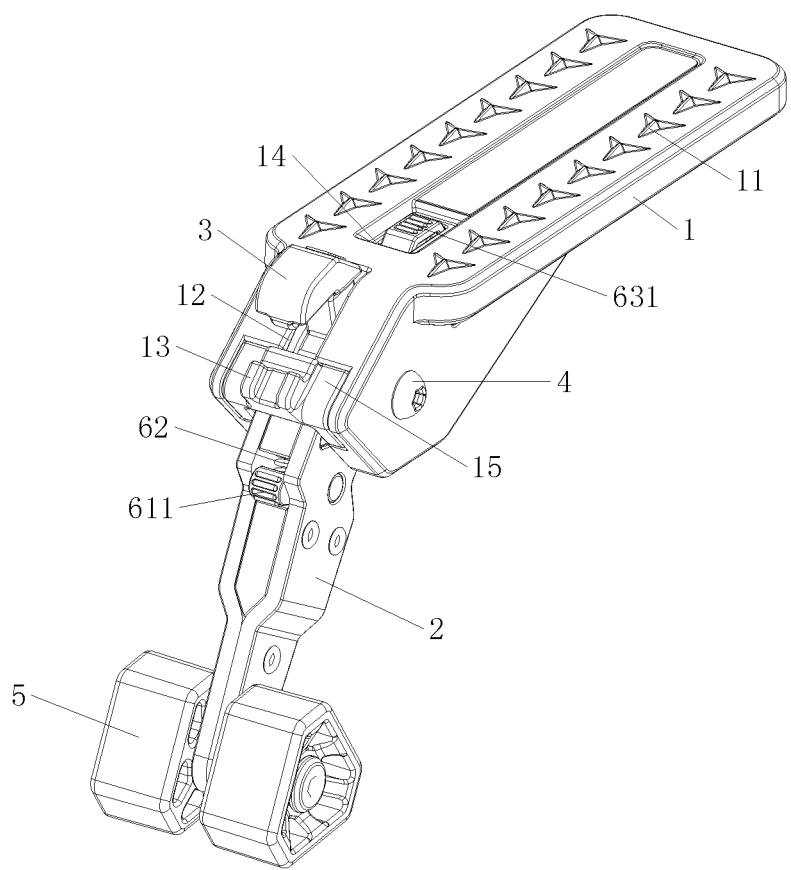
FIG. 2 Schematic view of Embodiment 6.
Figure 3:
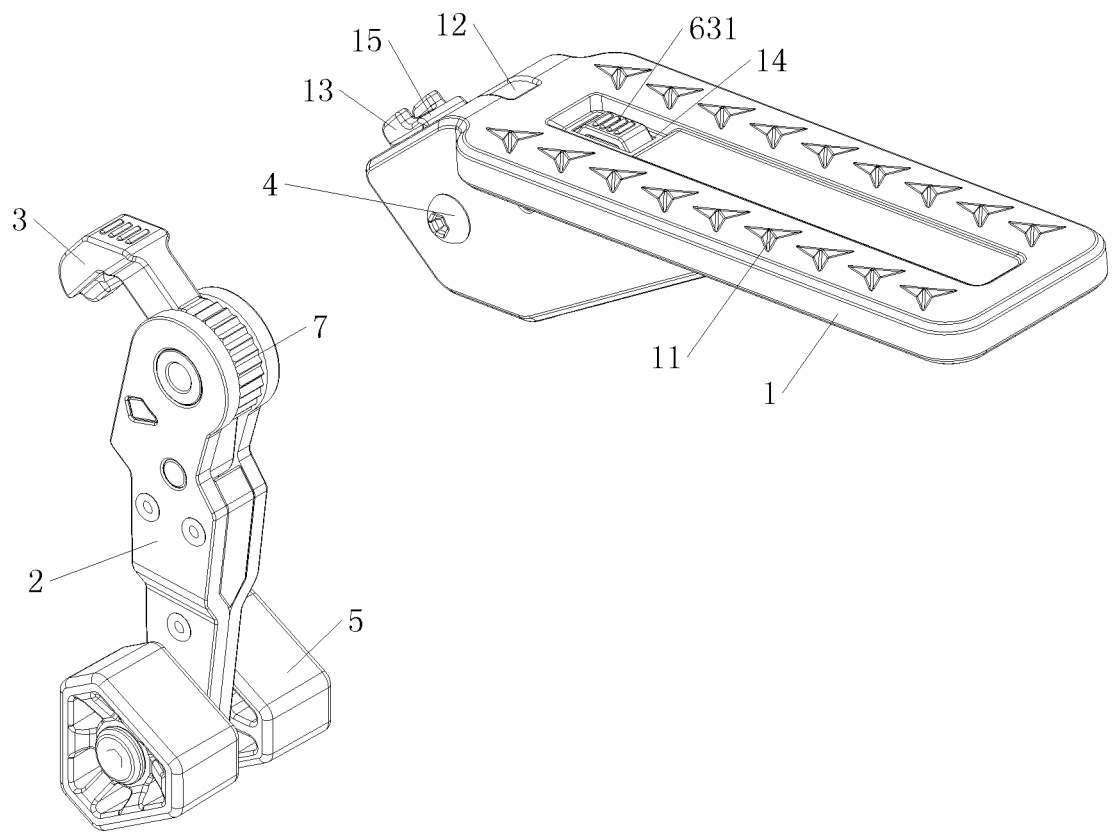
FIG. 3 Exploded schematic view of Embodiment 6.

On the basis of the above-mentioned Embodiment 1, as shown in FIG. 2 and FIG. 3, one end of footboard 1 is mounted with fixture block 13, which is opposite and at both sides of hook 3.

Fixture block 13 is on both sides of hook 3 and forms an intermeshed structure with hook 3, forming a reliable locking structure that constrains hook 3 and footboard 1 on car latch 92. Fixture block 13 and hook 3 can also be pressed against car latch 92 together. In this case, the contact area between fixture block 13 and car latch 92 is increased to achieve higher stability and reliability, and effectively reduces the wobbling of the adjustable car latch footboard.

Embodiment 3

Figure 4:
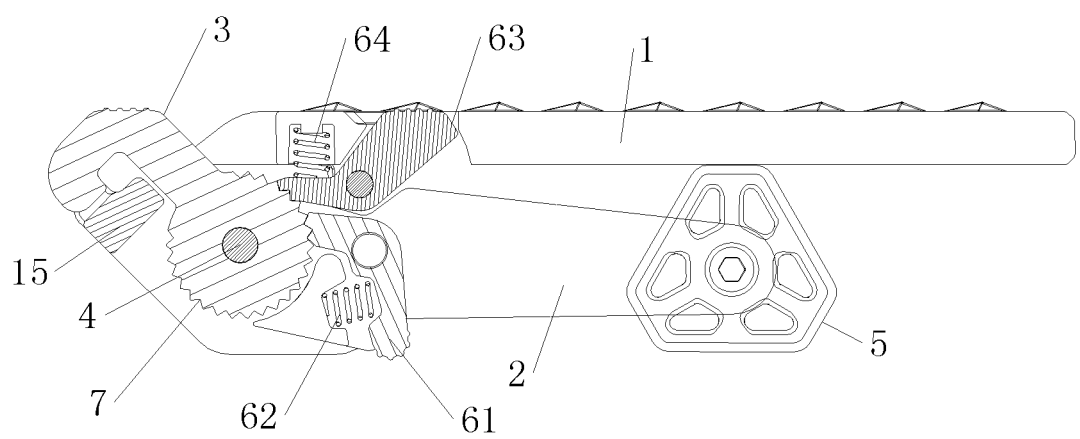
FIG. 4 Section view of Embodiment 6, in which the footboard is folded.

On the basis of the above-mentioned Embodiment 1, as shown in FIG. 2 to FIG. 4, reinforcing block 15 is included and secured to the end of footboard 1, opposite to and in contact with hook 3 and car latch 92. Reinforcing block 15 is made of steel and alloy steel characterized by a high degree of hardness and is pressed against the latch 92 without deformation.

Figure 19:
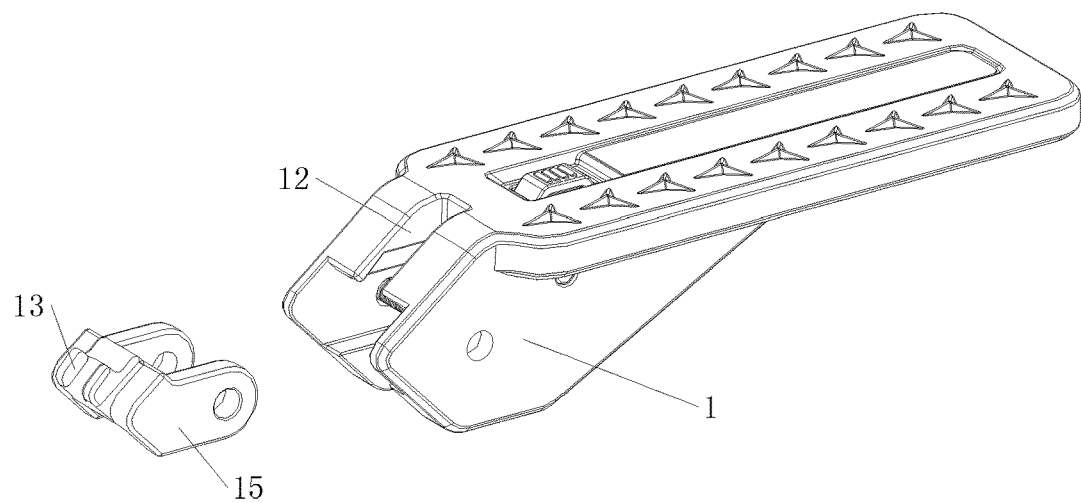
FIG. 19 Schematic view of the reinforcing block and the fixture blocks as an integral structure.

As shown in FIG. 19, the adjustable car latch footboard also compromises fixture block 13 secured to reinforcing block 15, opposite to hook 3 and at both sides of hook 3. Fixture block 13 is pressed against the inner side of car latch 92. In this case, the contact area between fixture block 13 and car latch 92 is increased to achieve higher stability and reliability, and effectively eliminates the wobbling of the adjustable car latch footboard. Fixture block 13 and reinforcing block 15 are an integral structure.

Embodiment 4

On the basis of any of the above-mentioned embodiments, as shown in FIG. 1 to FIG. 19, support block 15 is also included and installed on the other end of bracket component 2. The support block is made of plastic or an elastic material to avoid pressure damage to car door frame 91. No trace will be left on the car door frame 91 nor will its paint be damaged.

Wherein, two support blocks 5 can be symmetrically installed at both sides of the bracket component 2. The support blocks 5 are symmetrically mounted on both sides of the bracket component 2 to increase its contact area with the door frame 91 and provide support from both sides of the bracket component 2 to improve the stability of the bottom part of it, so as to raise the overall stability of the adjustable car latch footboard and reduce wobbling.

In some embodiments, at least two adjusting surfaces 51 are mounted on the support block 5. Specifically, the support block 5 has 3, 4 or 6 adjustment surfaces. The adjustment surface can be rotated according to the angle of the car door frame 91, so that the footboard 1 is level or nearly level.

Embodiment 5

On the basis of any above-mentioned embodiments, as shown in FIG. 2 to FIG. 12, the invention also comprises a ratchet 7, a first pawl 61 and a first spring 62. The ratchet 7 is rotatably mounted on the pivot 4 and the hook 3 is mounted on the ratchet 7 to form an integral structure; the first pawl 61 is hinged to the bracket component 2 and at one side of the ratchet 7; the first spring 62 is connected to the bracket component 2 and the first pawl 61 at both ends, and presses the first pawl 61 against the ratchet 7.

The ratchet 7 and the first pawl can be used to adjust the footboard 1 to any level. When folding or adjusting the footboard angle, a person can press the first toggle 611 to rotate and separate first pawl 61 from the ratchet 7 and then rotate downwards or fold the footboard 1; it is not required to press the first toggle 611 when the footboard 1 is unfolded or adjusted upwards. Instead, the footboard 1 can be directly pulled away from the bracket component 2, during which, the first pawl 61 locks the ratchet 7 by being pushed by the first spring, so that the footboard 1 can be fixed at any whatever angle is required to adapt to any vehicle model. The ratchet 7 and the first pawl 61 can rapidly adjust the footboard 1 to a level status. To remove the adjustable car latch footboard, the footboard 1 is pulled upward to separate its end from the hook 3, and then the adjustable car latch footboard is removed and the first pawl 61 is pressed to rotate the bracket component 2 towards the footboard 1, so that the bracket component 2 is folded to the space beneath the footboard 1.

Wherein, the first pawl 61 is mounted with the first toggle 611 at one side of the hook 3, namely, the first pawl 61 is at one side of the car door frame 91 to facilitate toggling the first pawl 61. The first toggle 611 can also be designed with non-slip stripes 11.

When in use, the hook 3 is hung on the car latch 92, and the end of the bracket component 2 is pressed against the car door frame 91 and beneath the car latch 92. One end of the footboard 1 is pressed against the car latch 92, and the footboard 1 is adjusted to be level or nearly level. The hook 3 and the footboard 1 grip the car latch to secure the adjustable car latch footboard. To remove the adjustable car latch footboard, the footboard 1 is pulled upwards to separate its end from the hook 3, and then the adjustable car latch footboard is removed directly when the gap between the footboard 1 and the hook 3 is larger than the diameter of the car latch 92 and the first pawl 61 is pressed to rotate the bracket component 2 towards the footboard 1, so that the bracket component 2 is folded into the space beneath the footboard 1.

When the footboard is designed with a fixture block 13, to remove the adjustable car latch footboard from the car latch 92, the gap between the fixture block 13 and the hook 3 shall be larger than the diameter of the car latch 92.

Embodiment 6

On the basis of Embodiment 5, as shown in FIG. 2 to FIG. 12, the invention also comprises a second pawl 63 and a second spring 64. The second pawl 63 is hinged on the footboard 1; the second spring 64 is connected to the footboard 1 and the second pawl 63 at both ends, and presses the second pawl 63 against the ratchet 7.

The second pawl 63 achieves the relative fixation of the footboard 1 and the ratchet 7. When the footboard 1 is adjusted upwards, the second spring 64 pushes the second pawl 63 to lock the ratchet 7 in place to facilitate its use.

The second pawl 63 is mounted with the second toggle 631, which is located in the toggle hole 14 of the footboard 1. To remove the adjustable car latch footboard, the second toggle 631 is pressed to separate the second pawl 63 from the ratchet 7, and then the footboard 1 is rotated upwards to separate the end of the footboard 1 from the hook 3. The adjustable car latch footboard is directly removed when the gap between the footboard 1 and the hook 3 is larger than the diameter of the car latch 92 and the first pawl 61 is pressed to rotate the bracket component 2 towards the footboard 1, so that the bracket component 2 is folded to the space beneath the footboard 1. To remove the adjustable car latch footboard, the second toggle 631 and the first part 611 are pressed at the same time, and then the footboard 1 rotates upwards. The adjustable car latch footboard is directly removed from the car latch 92 when the gap between the footboard 1 and the hook 3 permits. The bracket component 2 is then folded towards the footboard 1 to store the adjustable car latch footboard.

The surface of the second toggle 631 shall be lower than the surface of the footboard 1.

The second toggle 631 is designed with non-slip stripes 11.

Figure 5:
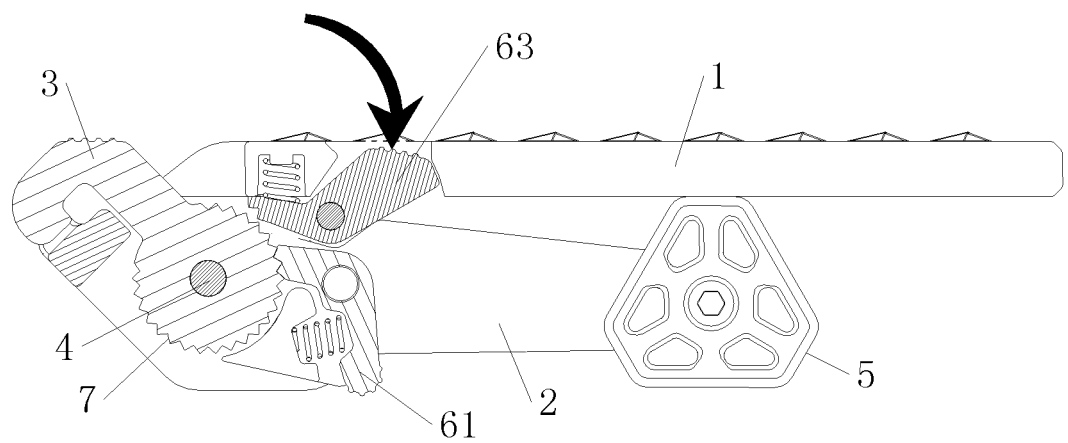
FIG. 5 Schematic view of Embodiment 6, in which the adjustable car latch press is pressed against the second pawl to open the bracket component and hook.
Figure 6:
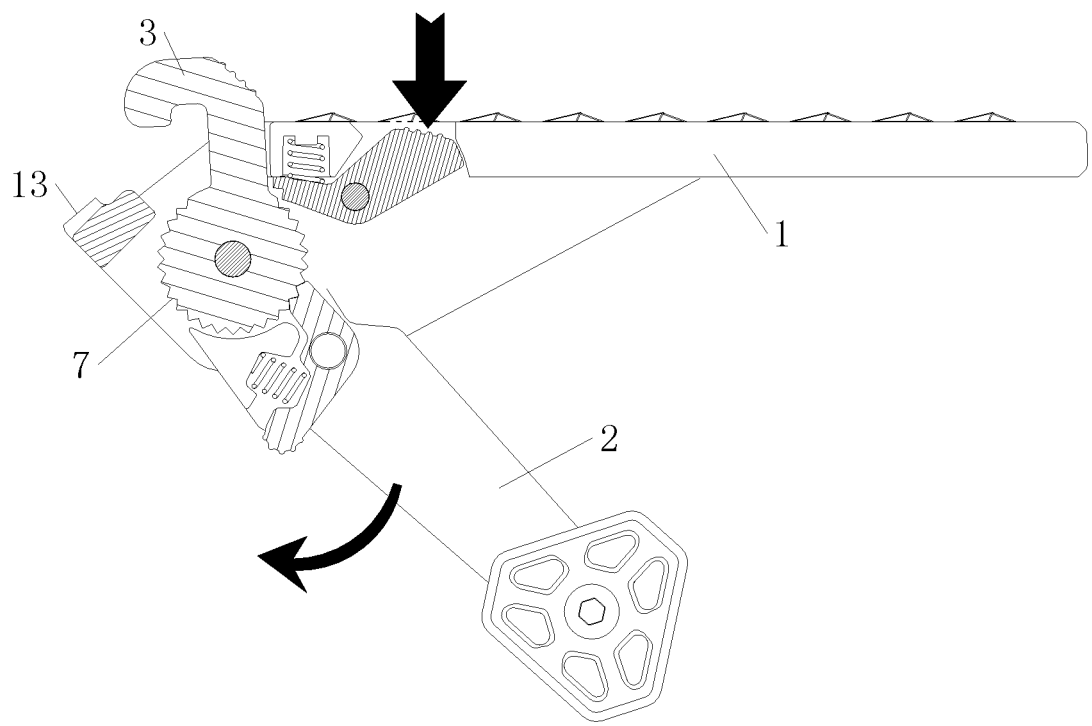
FIG. 6 Schematic view of Embodiment 6, in which the adjustable car latch footboard is opened and ready to be inserted into the car latch.
Figure 7:
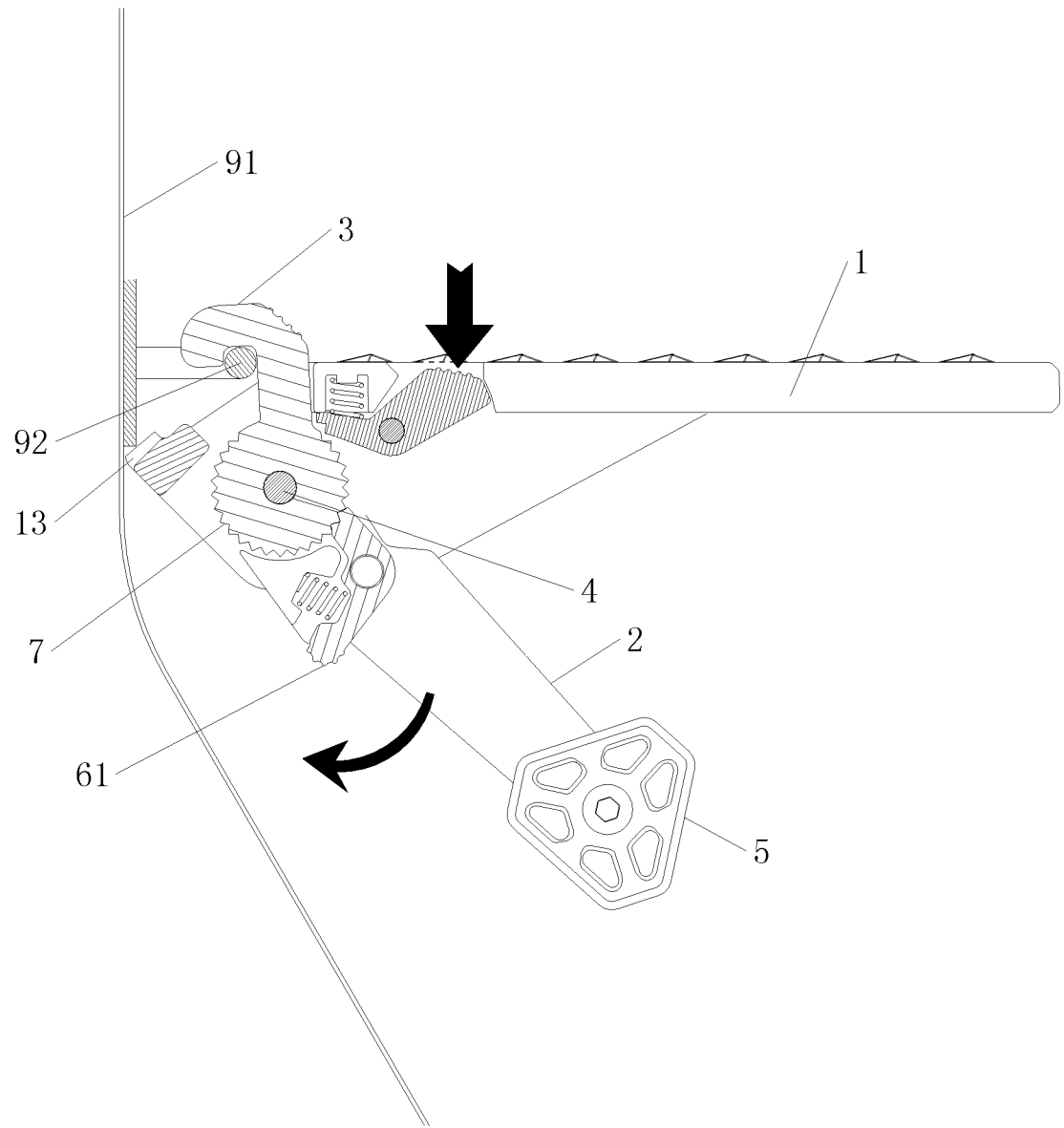
FIG. 7 Schematic view of Embodiment 6, in which the hook is hung on the car latch.
Figure 8:
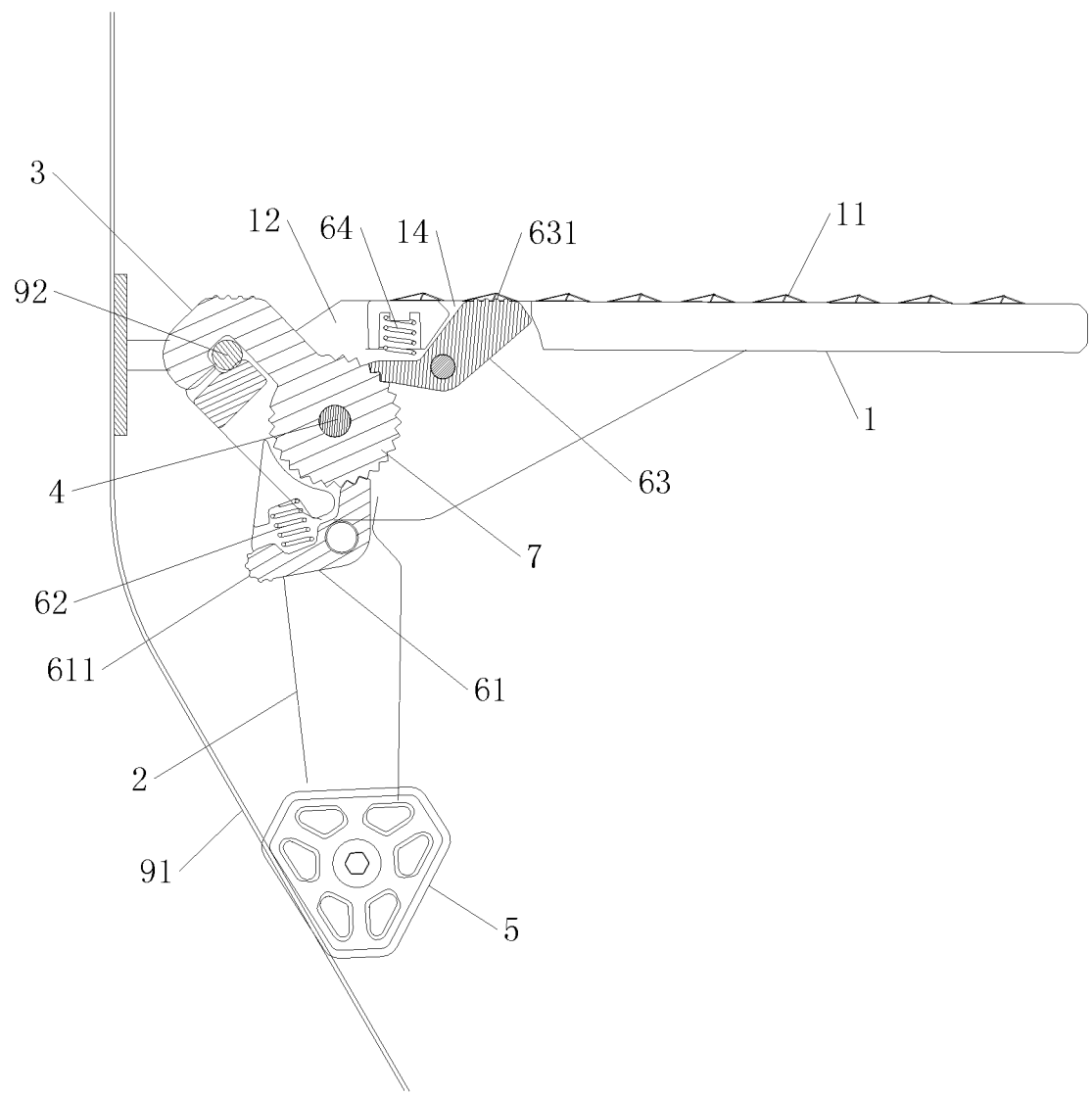
FIG. 8 Schematic view of Embodiment 6, in which the adjustable car latch footboard is in service and the door frame has a large slope.
Figure 9:
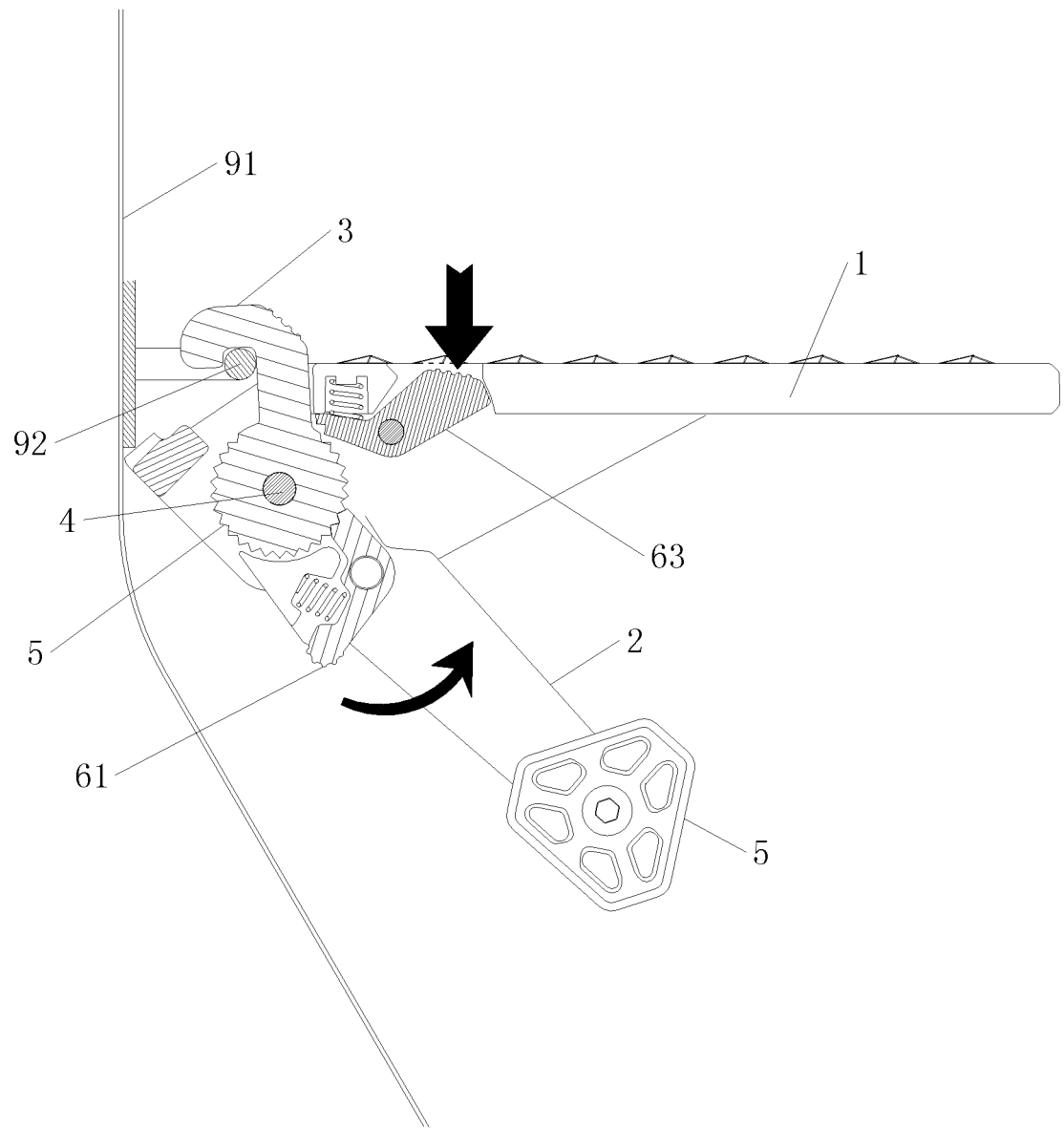
FIG. 9 Schematic view of Embodiment 6, in which the adjustable car latch footboard is being removed.
Figure 10:
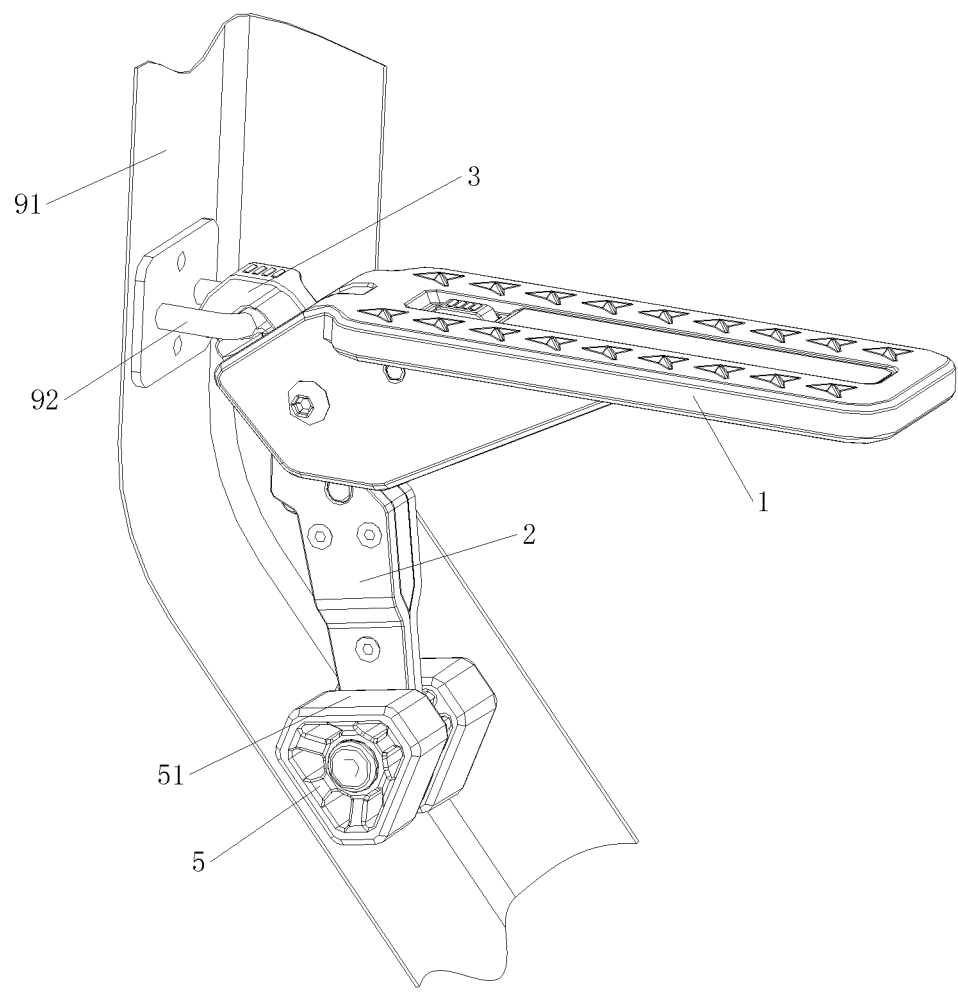
Figure 11:
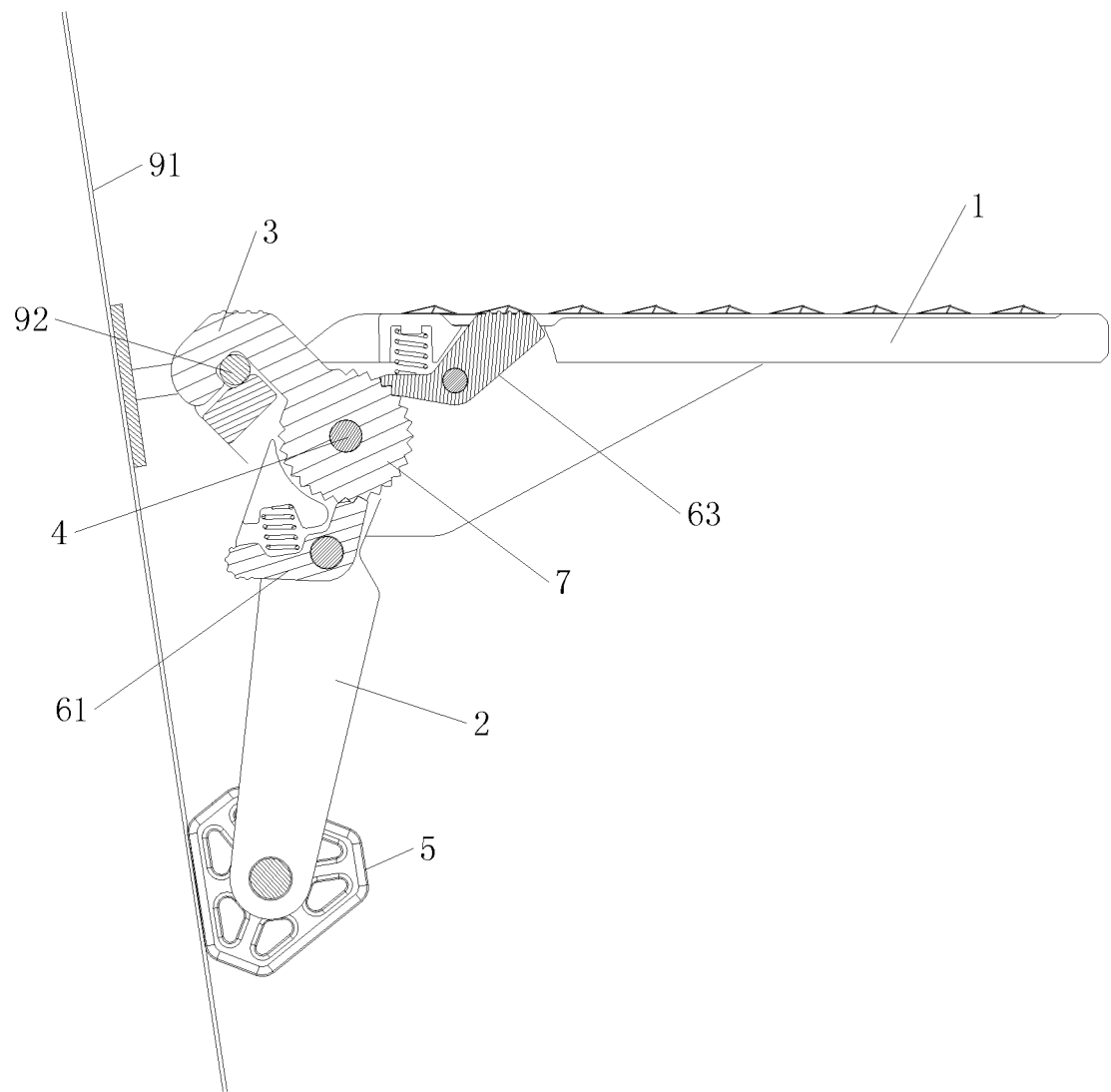
FIG. 11 Schematic view of Embodiment 6, in which the adjustable car latch footboard is in service and the door frame has a small slope.
Figure 12:
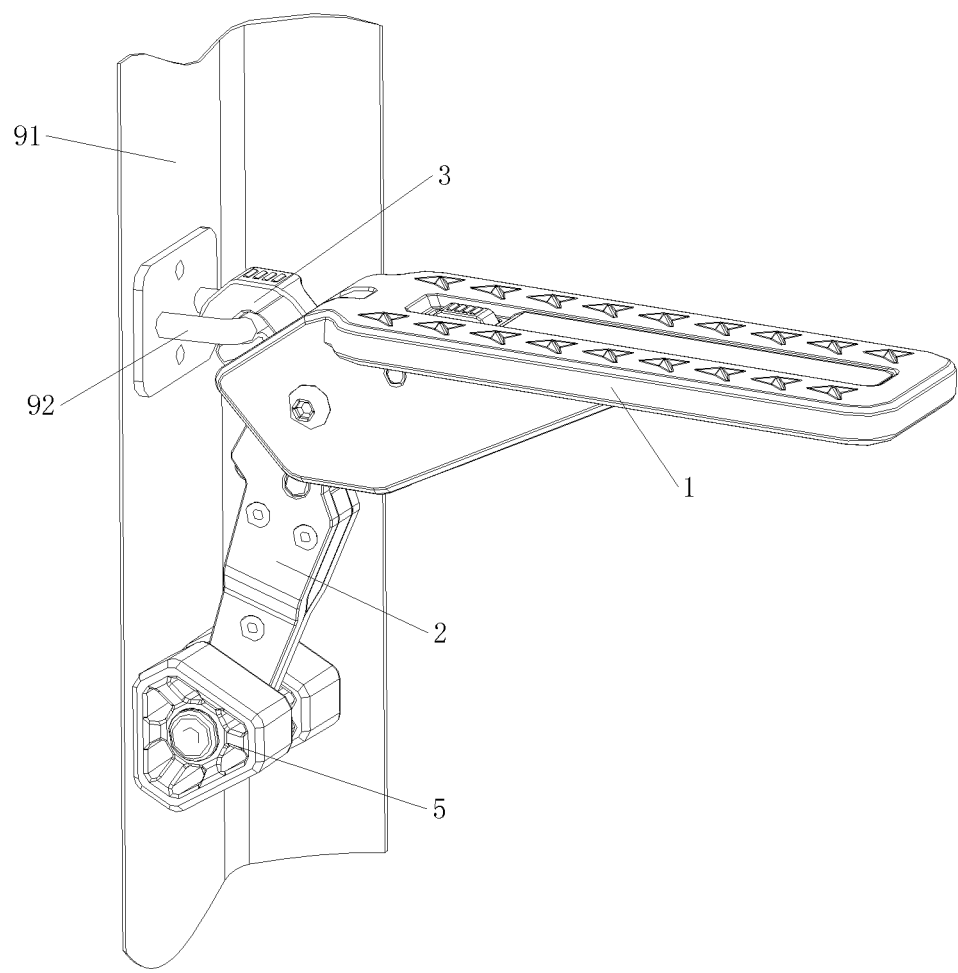
FIG. 12 is the 3D schematic view of FIG. 11.

When in use, as shown in FIG. 5 to FIG. 7, the adjustable car latch footboard is folded, the toggle 631 of the second pawl 63 is pressed, and the bracket component 2 is held and pulled. When the hook 3 opens to a certain degree, the second pawl 63 is released to prevent the hook 3 from rotating. The hook 3 is then inserted into the car latch 92 and the bracket component 2 is pressed against the car door frame 91. The footboard 1 is rotated upwards to a level or nearly level position. One end of the footboard 1 is pressed beneath the car latch 92 to secure the adjustable car latch footboard. To remove the adjustable car latch footboard, the second toggle 631 is pressed to separate the second pawl 63 from the ratchet 7. The footboard 1 is then elevated upwards to separate the fixture block 13 on the footboard from the hook. The adjustable car latch footboard is removed from the car latch 92 when the fixture block 13 and the hook 3 open to a certain degree. The first toggle 611 is pressed to separate the first pawl 61 from the ratchet 7. The bracket component 2 is then elevated so it is in contact with the footboard 1 for the footboard to be folded.

Embodiment 7

Figure 13:
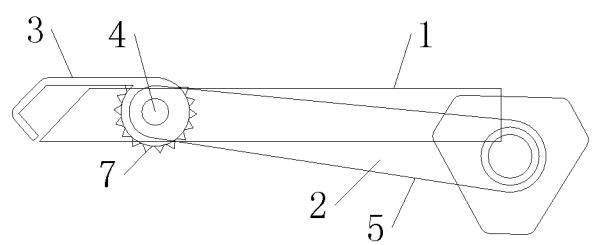
FIG. 13 Schematic view of Embodiment 8, in which the adjustable car latch footboard is folded.
Figure 14:
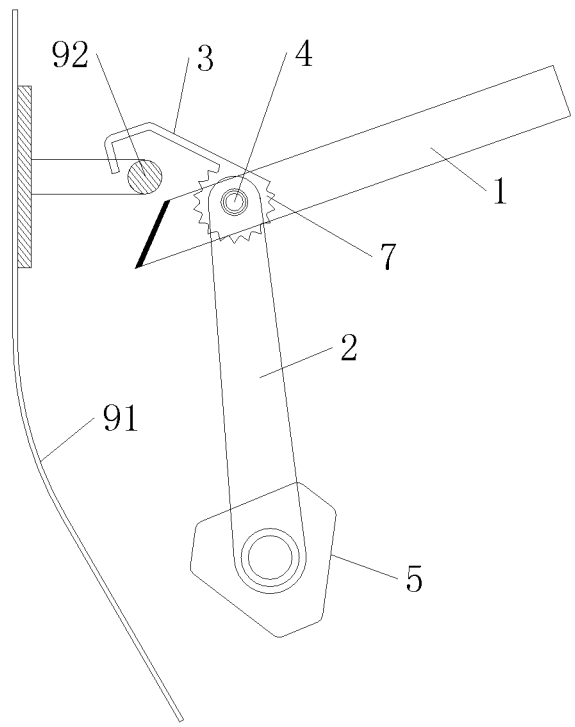
FIG. 14 Schematic view of Embodiment 8, in which the adjustable car latch footboard is installed on the car latch.
Figure 15:
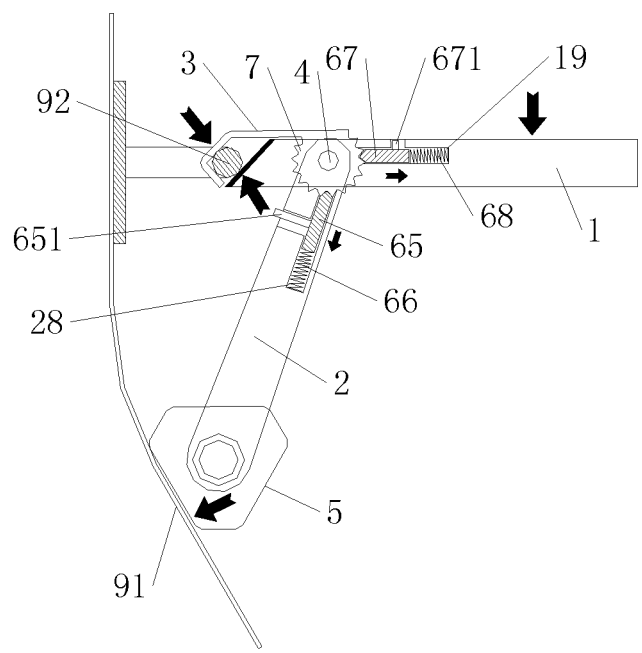
FIG. 15 Schematic view of the adjustable car latch footboard in Embodiment 8.

On the basis of any above-mentioned Embodiments 1 to 4, as shown in FIG. 13 to FIG. 15, in this embodiment, the third pawl 65 is slidably installed in the third slide hole 28 of the bracket component 2 and opposite to the ratchet 7. The third spring 66 is between the third pawl 65 and the bottom of the third slide hole 28 and presses the third pawl 65 against the ratchet 7. The third pawl 65 is also provided with the third toggle 651 to toggle the third pawl 65. The third toggle 651 is located on one side of the hook 3 to facilitate the separation of the third pawl 65 from the ratchet 7 during removal and folding.

The difference between this embodiment and Embodiment 5 lies in the installation method of the pawl, but the functions of the pawl remains the same. The pawl can rotate or translate to achieve the purpose of blocking, which means that the pawl is installed on the bracket component 2 by hinging or sliding.

Embodiment 8

On the basis of Embodiment 7, as shown in FIG. 12 to FIG. 15, this embodiment also contains a fourth pawl 67 and a fourth spring 68. The fourth pawl 67 is slidably installed in the fourth slide hole 19 of the footboard 1 and opposite to the ratchet 7. The fourth spring 68 is between the fourth pawl 67 and the bottom of the fourth slide hole 19 and presses the fourth pawl 67 against the ratchet 7. The fourth pawl 67 is also provided with the fourth toggle 671 to toggle the fourth pawl 67. The fourth toggle 671 is located beneath the footboard 1 surface to facilitate the separation of the fourth pawl 67 from the ratchet 7 during removal and folding.

Embodiment 9

Figure 16:
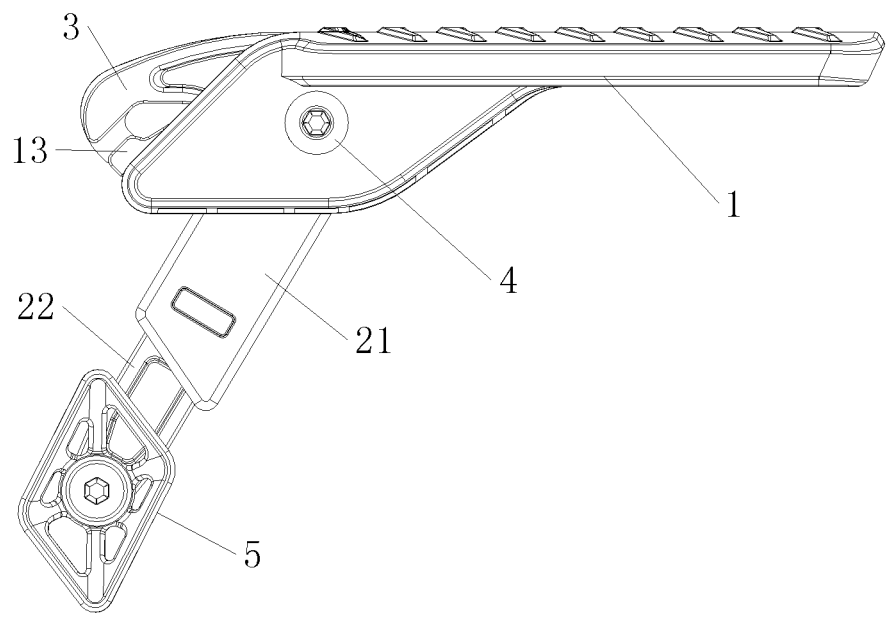
FIG. 16 Schematic view of the adjustable car latch footboard in Embodiment 9.
Figure 17:
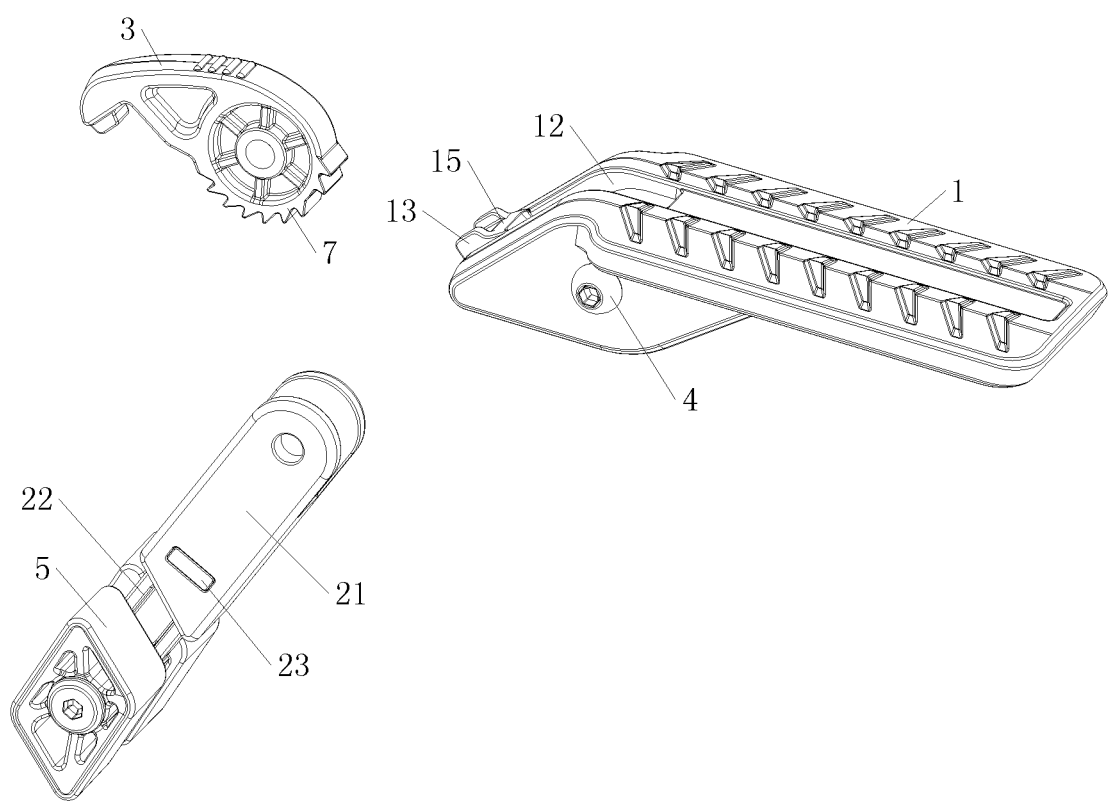
FIG. 17 Exploded schematic view of the adjustable car latch footboard in Embodiment 9.
Figure 18:
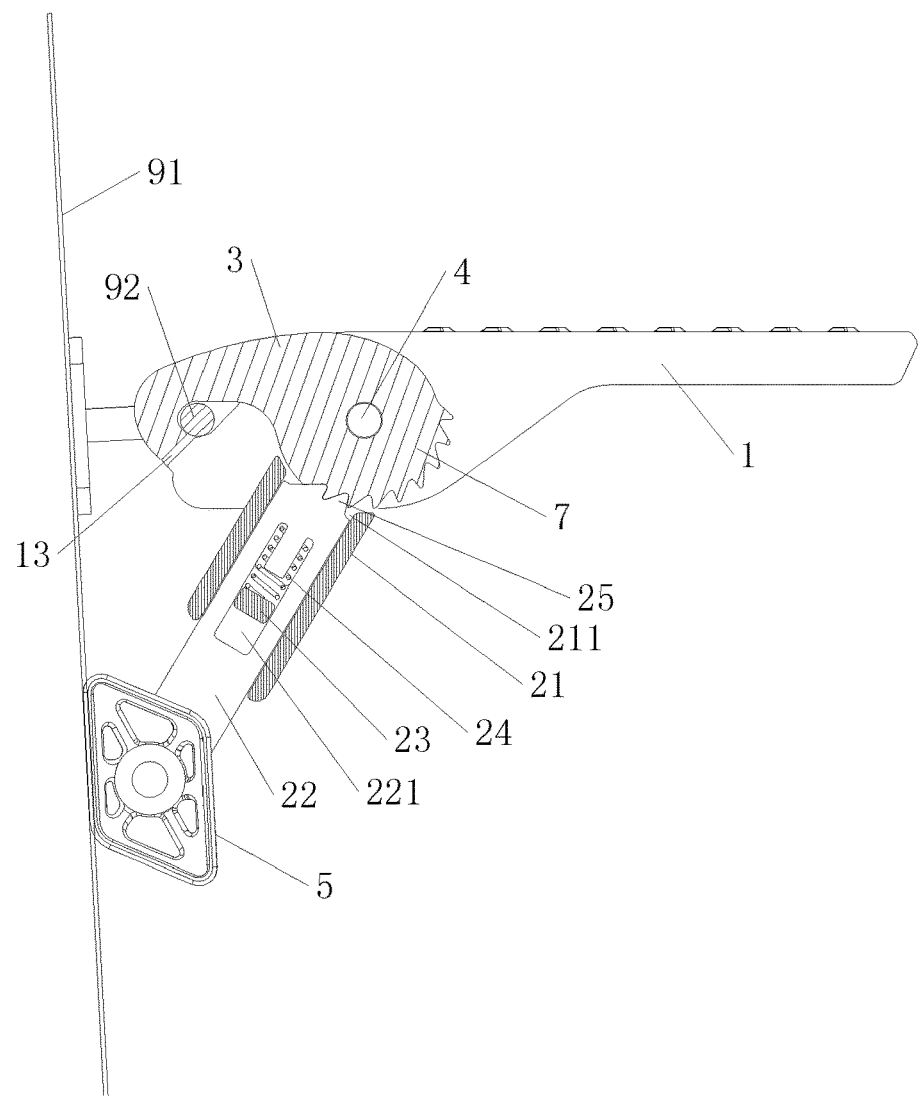
FIG. 18 Schematic view of Embodiment 9, in which the adjustable car latch footboard is installed on the car latch.

On the basis of any above-mentioned Embodiments 1 to 4, as shown in FIG. 16-FIG. 18, the bracket component 2 consists of the bracket base 21 and the sliding bar 22. The bracket base 21 is hinged to the pivot 4 and the sliding bar is slidably inserted into the bracket base 21; it also comprises the ratchet 7, the fifth pawl 25 and the fifth spring 24. The ratchet 7 is rotatably mounted on the pivot 4 and the hook 3 is mounted on the ratchet 7; the fifth pawl 25 is mounted on the end of the sliding bar 22 and opposite to the ratchet 7; the fifth spring 24 is connected to the sliding bar 22 and the bracket base 21 at both ends, and presses the fifth pawl 25 against the ratchet 7.

The bracket base 21 is equipped with a fifth slide hole 211, in which a spring rod 23 is mounted. The sliding bar 22 is slidably inserted into the fifth slide hole 211 and is equipped with the sixth slide hole 221 which is movably inserted on the spring rod 23, and the fifth spring 24 is movably inserted in the sixth slide hole 221. Both ends of the fifth spring 24 are connected to the bottom of the spring rod 23 and the sixth slide hole 221, to press the pawl 25 on the ratchet 7.

The fifth pawl 25 and the ratchet 7 work to adjust the hook 3 position, so as to adjust the level of the footboard 1. The structure is simple and easy to use.

When in use, the footboard 1 is rotated to separate its end from the hook 3, and hook 3 is hung on the car latch 92. The footboard 1 is dropped, and its end is pressed against the car latch 92. The hook 3 is pressed and the sliding bar 22 moves toward the car door frame 1 to press the bottom of the sliding rod 22 on the car door frame 91, and then the footboard 1 is adjusted upwards to level or nearly level, so as to accomplish the installation of the adjustable car latch footboard.

To remove the adjustable car latch footboard, the footboard 1 is pulled upwards to separate its end from the hook 3, and then the adjustable car latch footboard is removed directly when the gap between the footboard 1 and the hook 3 is larger than the diameter of the car latch 92 and the sliding rod 22 is pulled away from the ratchet 7 to separate the fifth pawl 25 from the ratchet 7. The sliding rod 22 is stored beneath the footboard land loosened to fold the adjustable car latch footboard.

The difference between this embodiment and Embodiment 4 lies in the installation method of the pawl, and the functions of the pawl remain the same. The pawl can be installed on the footboard 1 by hinging or sliding.

Compared with the prior art, the present invention has the following beneficial effects:

1. The footboard angle can be adjusted according to the slope of the car door frame so that the footboard is always parallel to the ground;
2. The support block is in contact with the car door to increase the contact area with the car door frame and effectively reduce damage to the car body;
3. The footboard is more stably and securely installed on the car latch by the upper and lower gripping structure, so that the footboard will not fall off.
4. The footboard surface is flat and at a higher position to facilitate its operation;
5. Easy to use and light, the footboard can be folded and stored in the car glove compartment when not in use.

The technical principles of the present invention have been described above in conjunction with the specific embodiments. These descriptions are to explain the principle of the present invention and shall not be construed in any way as a restriction to the scope of protection for the present invention. Based on the explanations herein, any changes or substitutions within the technical scope of the present invention that a person skilled in the art can easily think of shall be covered by the scope of the present invention.

The invention claimed is:

1. An adjustable car latch footboard, comprising: a footboard, a hook, a bracket component and a pivot; wherein the footboard hinges on the bracket component through the pivot, and the hook is mounted at one end of the bracket component and is opposite to an end of the footboard, the hook is attached to a car latch, and the other end of the bracket component is pressed against a car door frame, the end of the footboard is pressed against the hook or the car latch, when the footboard is pressed onto the hook, the car latch is positioned between the footboard and the hook; when the footboard is pressed onto the car latch, the footboard and the hook grip onto the car latch;

wherein the adjustable car latch footboard further comprises a reinforcing block secured to the end of the footboard, and is opposite to and in contact with the hook and the car latch.

2. The adjustable car latch footboard according to claim 1, wherein blocks are provided at the end of the footboard, opposite to the hook and at both sides of the hook.

3. The adjustable car latch footboard according to claim 1, further comprising a fixture block secured to the reinforcing block, wherein the fixture block is opposite to the hook and is arranged at both sides of the hook.

4. The adjustable car latch footboard according to claim 1, further comprising at least one support block installed at the other end of the bracket component and pressed against the car door frame.

5. The adjustable car latch footboard according to claim 4, wherein at least two adjusting surfaces are provided on the support block.

6. The adjustable car latch footboard according to claim 4, wherein the number of the at least one support block is two, and two support blocks are symmetrically installed on both sides of the bracket component.

7. The adjustable car latch footboard according to claim 1, wherein non-slip stripes are formed on the footboard surface.

8. The adjustable car latch footboard according to claim 1, further comprising a ratchet, a first pawl and a first spring, wherein the ratchet is installed on the pivot and the hook is mounted on the ratchet; the first pawl is movably mounted on the bracket component and at one side of the ratchet; both ends of the first spring is connected to the bracket component and the first pawl respectively, and the first spring presses the first pawl against the ratchet.

9. The adjustable car latch footboard according to claim 8, wherein a first toggle part is mounted on the first pawl and at one side of the hook.

10. The adjustable car latch footboard according to claim 8, further comprising a second pawl and a second spring, wherein the second pawl is movably mounted on the footboard; the second spring is connected to the footboard and the second pawl at both ends, and presses the second pawl against the ratchet.

11. The adjustable car latch footboard according to claim 10, wherein a the second toggle part is mounted on a second pawl and in the toggle hole of the footboard.

12. The adjustable car latch footboard according to claim 1, wherein the bracket component comprises a bracket base hinged to the pivot and a sliding bar inserted into the bracket base;

the adjustable car latch footboard further comprises a ratchet, a fifth pawl and a fifth spring, wherein the ratchet is rotatably mounted on the pivot and the hook is mounted on the ratchet; the fifth pawl is mounted on the end of the sliding bar opposite to the ratchet; the fifth spring is connected to the sliding bar and the bracket base at both ends, and presses the fifth pawl against the ratchet.

* * * * *